Oct. 6, 1964
J. V. TRIPOLI ET AL
3,151,838
PACKLESS GATE VALVE
Filed July 31, 1961
2 Sheets-Sheet 1
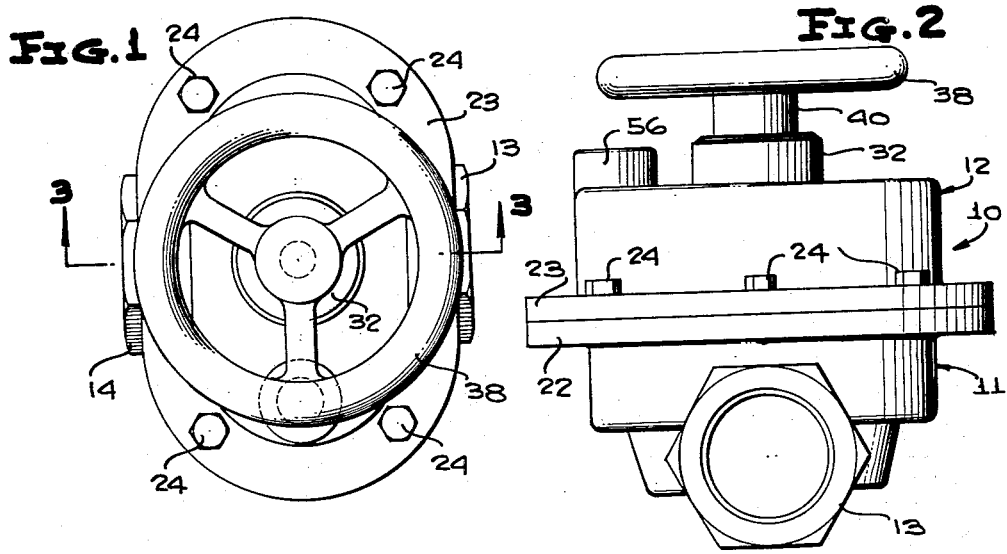
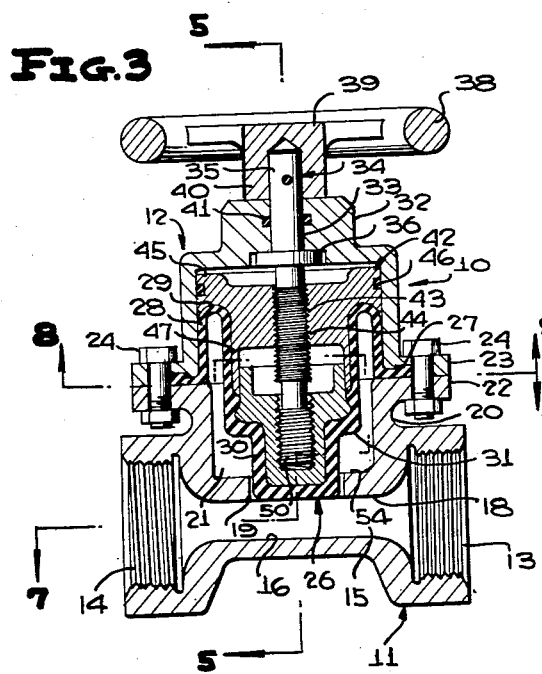
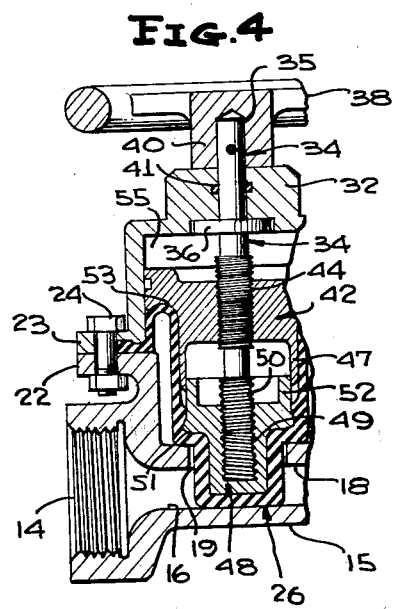
INVENTORS
JOSEPH V. TRIPOLI
& HERMAN KLAUBE
BY Lowry & Rinehart
ATTORNEYS

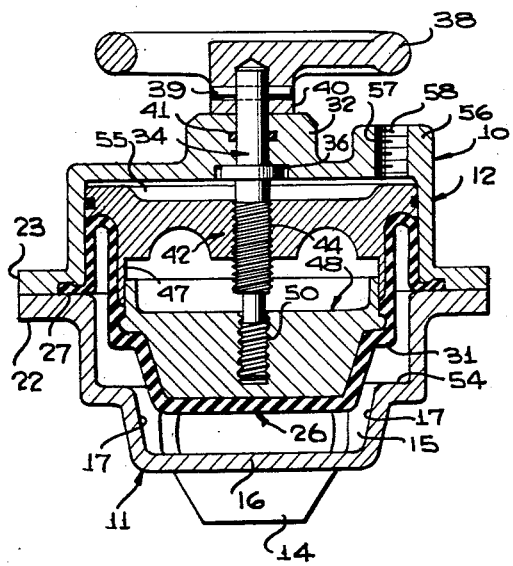
Fig. 5
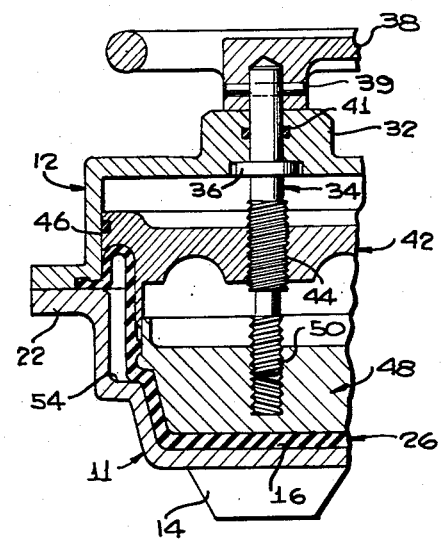
Fig. 6
Fig. 7
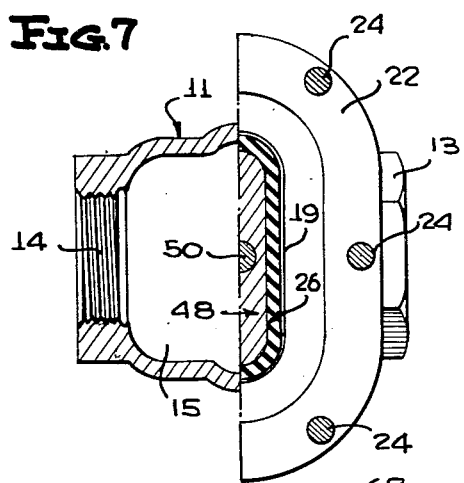
Fig. 8
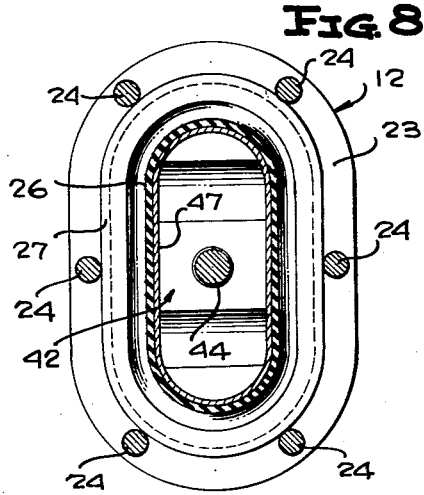
Fig. 9
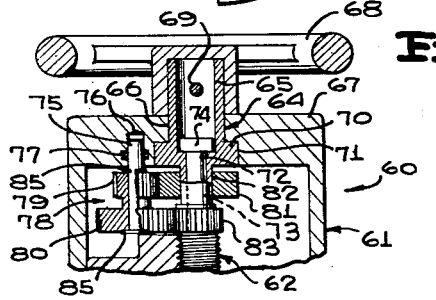
INVENTORS
JOSEPH V. TRIPOLI
& HERMAN KLAUBE
BY Lowry & Rinehart
ATTORNEYS United States Patent Office 3,151,838
Patented Oct. 6, 1964

3,151,838
PACKLESS GATE VALVE
Joseph V. Tripoli, 72 Doncaster Road, Kenmore, N.Y., and Herman Klaube, Buffalo, N.Y.; said Klaube assignor to said Tripoli
Filed July 31, 1961, Ser. No. 127,944
1 Claim. (Cl. 251—267)

This invention relates in general to new and useful improvements in valve construction, and more particularly to a novel packless gate valve.

A primary object of this invention is to provide a novel gate valve which utilizes a diaphragm as the valve element, the diaphragm having a peripheral edge sealed to the valve body whereby packing of the valve stem to prevent the escape of fluid is unnecessary.

Another object of this invention is to provide a novel gate valve which utilizes a diaphragm as the valve element, the diaphragm being engageable with the valve body in a manner to assure a complete seal.

Another object of this invention is to provide a novel gate valve which utilizes a diaphragm as the sealing member, the gate valve including a follower for effecting the movement of the diaphragm and a guide associated with the follower, the guide and the follower both being movable with respect to the valve body and the movement of the follower being more rapid than the guide wherein proper control of the flexing of the diaphragm is controlled.

Still another object of this invention is to provide a novel gate valve wherein the flow passage of the gate valve at the point where the valve member effects a control of the flow through the flow passage is relatively shallow as compared to the diameter of the pipe for which the gate valve is intended wherein the necessary movement of the valve member to effect opening and closing of the valve is greatly reduced.

A further object of this invention is to provide a novel gate valve wherein the cross-section of the flow passage is slightly increased so as to provide a slight reduction in pressure at the point of seal of the gate valve while at the same time preventing undue turbulences.

Still another object of this invention is to provide a novel gate valve wherein a diaphragm is used as the valve member, the gate valve having a chamber disposed above the diaphragm in which pressure may be built up as the diaphragm is being moved to an open position wherein this pressure will counterbalance the pressure exerted on the valve member resisting closing of the valve.

A still further object of this invention is to provide a novel gate valve which includes a sealed chamber therein and in which suitable gearing may be placed wherein the turning action of a valve control handle may be greatly multiplied so as to increase the speed of rotation of a valve stem and thereby effect the rapid movement of a valve member between open and closed positions.

Yet another object of this invention is to provide an extremely simple gate valve which is of a nature wherein it may be readily manufactured and assembled so as to be economically feasible.

Still another object of this invention is to provide a novel gate valve which utilizes a diaphragm as a valve member, the diaphragm being reversely folded upon itself and having a peripheral edge sealed to the valve body to prevent any leakage past the diaphragm, that portion of the diaphragm being folded being relatively thin and extremely flexible wherein undue friction during the movement of the valve member between an open and closed position is prevented.

Still another object of this invention is to provide a novel gate valve wherein a diaphragm is utilized as the valve member, the diaphragm having seating engagement not only with surfaces of the flow passage of the valve body, but also around an opening in the valve body through which the diaphragm passes so as to assure a complete sealing of the flow passage when the valve member is in a valve closing position.

With the above and other objects in view that will hereinafter appear, the nature of the invention will be more clearly understood by reference to the following detailed description, the appended claims and the several views illustrated in the accompanying drawings.

In the drawings:

FIGURE 1 is a plan view of the gate valve formed in accordance with this invention.

FIGURE 2 is an end view of the gate valve of FIGURE 1 when looking from the right.

FIGURE 3 is a vertical sectional view taken along the line 3—3 of FIGURE 1, and shows the valve in its open position.

FIGURE 4 is a view similar to FIGURE 3, and shows the valve in its closed position.

FIGURE 5 is a vertical sectional view taken along the line 5—5 of FIGURE 3, and shows further the details of the valve construction.

FIGURE 6 is a view similar to FIGURE 5 and shows the valve in its closed position.

FIGURE 7 is a horizontal sectional view taken along the line 7—7 of FIGURE 3, and shows further the details of the valve construction.

FIGURE 8 is a horizontal sectional view taken along the line 8—8 of FIGURE 3, and shows the general details of the diaphragm and the associated follower.

FIGURE 9 is a fragmentary vertical sectional view through the upper portion of a modified form of valve showing gearing incorporated in the valve stem so as to increase the rate of rotation of the valve stem.

Referring now to the drawings in detail, it will be seen that there is illustrated in FIGURES 1 through 8 a packless gate valve in accordance with this invention, the gate valve being generally referred to by the numeral 10. The gate valve 10 is formed primarily of a valve body, generally referred to by the numeral 11, and a valve body extension, generally referred to by the numeral 12.

The valve body 11 is of an elongated construction and is provided with an internally threaded inlet opening 13 and an internally threaded outlet opening 14 into which pipes may be readily threaded. At this time, it is pointed out that there is no true distinction between the inlet opening 13 and the outlet opening 14 and the two may be reversed. Further, the connections could be soldered or flanged connections, the connections being no part of this invention.

The valve body 11 has a flow passage 15 extending between the inlet opening 13 and the outlet opening 14.

It is to be noted that the valve body 11 is flattened in the area of the flow passage 15 so that the flow passage 15 is relatively flat and wide, as compared to the circular inlet opening 13 and the circular outlet opening 14. As is clearly shown in FIGURE 5, the flow passage 15 in the central portion thereof is generally rectangular and is quite wide. It is pointed out at this time that the flow passage 15 has a cross-section greater than the cross-section of pipes which will be connected to the valve body 11. As a result, there is a reduction in velocity of fluid flowing through the flow passage 15, while maintaining line pressure. This body enlargement, including the specific shape thereof, cuts down the natural turbulence in the valve body. This also tends to compensate for the increase in velocity which takes place when the valve is put to use in a throttling position. The valve flow passage enlargement also compensates in part for reduction in impingement pressure on the gate segment of the diaphragm valve member when that part is in a throttling position. This is accomplished by creating a natural enlarged pocket, thereby reducing the skin friction between the internals of the valve body and the stream of fluid. The increase in area will generally range between 6% and 10%.

Reference is particularly made to FIGURES 5 and 6, wherein it is shown that the flow passage 15 has a relatively flat bottom surface 16 and upwardly diverging side surfaces 17. It is these surfaces with which the diaphragm valve member, to be described hereinafter, cooperates in sealing off the flow passage 15.

Attention is also directed to FIGURE 3 in particular wherein there is clearly shown that the flow passage 15 has a top wall 18 opposing the bottom wall 16. The top wall 18 has a transversely elongated opening 19 formed therein through which a valve member passes to effect the control of flow through the flow passage 15.

The valve body 11 also includes an upper portion 20 defining a chamber 21. The upper portion 20 terminates at the upper edge thereof in a flange 22 which is oval in shape, as is best shown in FIGURE 1.

The extension 12 is provided with a flange 23 which corresponds in shape to the flange 22 and which is clamped thereagainst by a plurality of spaced fasteners 24. It is to be noted that the extension 12 defines an upwardly disposed extension of the chamber 21.

As has been hereinbefore stated, the valve member of the gate valve 10 is in the form of a diaphragm, generally referred to by the numeral 26. The diaphragm 26 has a peripheral edge 27 which is clamped between the flanges 22 and 23 continuously about the periphery of the chamber 21 and thus seals the upper portion of the chamber 21 against the escape of fluid. The diaphragm 26 also includes a flexible upper body portion 28 which is reversely folded with the folds spaced apart, as at 29. The diaphragm 26 also includes a thickened lower portion 30 which is offset to provide a peripheral shoulder 31.

At this time, it is pointed out that although the diaphragm 26 has been illustrated as being formed of a solid plastic material, such as Teflon, or other suitable valve materials, it may be reinforced by a cloth or other type of reinforcement. In such event, the fibers of the reinforcement will run generally vertically in the direction shown in FIGURE 3 so as to in no way decrease the flexibility of the upper body portion 28 and the reverse folding thereof, as at 29.

The extension 12 includes an upper wall 32 having a bore 33 therethrough. A valve stem, generally referred to by the numeral 34, is carried by the wall 32. The valve stem 34 has a cylindrical upper portion 35 which extends through the bore 33 and is journaled therein. The upper portion 35 terminates at its lower end in a flange or collar 36 which is received within a recess 37 in the bottom of the wall 32 so as to prevent upward movement of the valve stem 34. A control handle 38 is secured to the upper end of the valve stem 34 in any desired manner, although a pin 39 has been illustrated for this purpose. The control handle 38 includes a hub 40 which bears against the upper surface of the wall 33 and, in cooperation with the collar 36, prevents vertical movement of the valve stem 34.

At this time, it is pointed out that although the gate valve 10 is of the packless type as far as the escape of fluids passing through the valve body 11 is concerned, the valve stem 34 is sealed with respect to the extension 32 by means of a suitable sealing ring 41 mounted in the wall 32. The purpose of the sealing ring 41 is to prevent the escape of air or other gases which may be trapped within the valve 10 above the diaphragm 26 for a purpose to be described hereinafter.

A guide, generally referred to by the numeral 42, is mounted in the extension 12 for vertical reciprocatory movement. The guide 42 has an internally threaded bore 43 in which there is threaded an intermediate portion 44 of the valve stem 34. The guide 42 has an upper portion 45 which is engaged with the inner surface of the extension 12, this inner surface being smooth to permit the freedom of movement of the guide 42 relative thereto. Further, the guide 42 has a sealing ring 46 carried by the upper portion 45 so as to effect a seal between the guide 42 and the extension 12. The guide 42 also includes a lower tubular guiding portion 47.

A follower, generally referred to by the numeral 48, is suitably engaged in a lower portion of the diaphragm 16. The follower 48 has an internally threaded bore 49 in which a threaded lower portion 50 of the valve stem 34 is engaged. The follower 48 also has a shoulder portion 51 which engages the offset portion of the diaphragm 26. It is to be noted that the follower 48 further has an upper portion 52 which is guided in the tubular lower portion 47 of the guide 42.

At this time, it is pointed out that the pitch of the threads of the intermediate portion 44 of the valve stem 34 is less than the pitch of the threads of the lower portion 50 of the valve stem 34. Thus, when the valve stem 34 is rotated, there is movement of both the guide 42 and the follower 48 and relative movement between the guide 42 and the follower 48, the follower 48 moving quicker and further than the guide 42. The guide 42 not only serves to guide the follower 48 in its vertical movement, but also functions as a guide for the folded portion of the diaphragm 26. It is to be noted that the underside of the guide 42 is configurated, as at 53, to engage the folded portion of the diaphragm 26 and to guide the same in its flexing as the follower 48 is vertically reciprocated in the movement of the diaphragm 26 between the valve opening positions and valve closing positions.

Referring once again to FIGURE 3 in particular, it will be seen that the diaphragm 26 will retract entirely through the opening 19 in the top wall 17 of the flow passage 15 to permit full flow of fluid through the flow passage 15. On the other hand, when the gate valve 10 is in a closed position, the diaphragm 26 moves down entirely across the flow passage 15 and not only engages the bottom wall 16 of the flow passage 15, but also wedgingly engages the side wall 17, as is shown in FIGURE 5. Further, the shoulder portion 31 of the diaphragm 26 is seated on a peripheral seat 54 which extends about the opening 19 and thus seals the opening 19. In this manner, a highly effective seal may be obtained.

While there is sufficient clearance between the diaphragm 26 and the walls of the opening 19 to permit the vertical reciprocation of the diaphragm 26, as is necessary in the movement of the diaphragm 26 to control the size of the flow passage 15, the flow of fluid through the opening 19 does not in any way affect the seal of the valve 10. This is due to the fact that the peripheral edge 27 of the diaphragm 26 is sealed with respect to the valve body 11 by being clamped between the flanges 22 and 23.

It is again pointed out here that the flow passage 15 is relatively shallow as compared to the diameter of the pipe to be connected to the valve body 11 but with an increase in cross-section of the flow passage over the cross-section of the pipe. This permits a relatively short travel of the diaphragm 26 between a closed position and a fully open position. Further, the size and shape of the flow passage 15 allows a reduction in velocity of the fluid going through the valve while maintaining line pressure and at the same time cuts down on the natural turbulences in the valve body, particularly when the diaphragm is in a partially open position.

It is now pointed out that by sealing the guide 42 with respect to the extension 12 and the valve stem 34 with respect to the extension 12, the sealed chamber 55 is formed in the extension 12 above the guide 42. As the guide 42 moves upwardly from its lowered position of FIGURE 4 to its raised position of FIGURE 3, air or other fluid trapped within the extension 12 will be compressed and will counterbalance the upward thrust on the bottom of the diaphragm 26. Thus, the force necessary to move the diaphragm 26 down to a more closed position is greatly reduced.

The extension 12, as is best shown in FIGURE 5, is provided with a boss 56 having an internally threaded bore 57 therethrough opening into the chamber 55. This bore 57 normally has a plug 58 therein closing the chamber 55 and keeping the same sealed. If desired, the chamber 55 could be pre-pressurized with any suitable gaseous fluid, such as air.

Reference is made now to FIGURE 9 in particular, wherein there is shown a valve stem arrangement suitable for use in larger valves, in valves where the diaphragm movement is greater than normal, or where a quicker action of the valve is desired. In the valve of FIGURE 9, which is generally referred to by the numeral 60, the extension of the valve body is generally referred to by the numeral 61 and is modified only in that it is vertically elongated. The extension 61 carries a modified form of valve stem, which is generally referred to by the numeral 62. The valve stem 62 has only the upper portion thereof modified as compared to the valve stem 34, and will not be specifically described except for the modifications.

The valve stem 62 includes an upper extension, generally referred to by the numeral 64. The extension 64 includes a tubular upper part 65 which is rotatably journaled in a bore 66 through a top wall 67 of the extension 61. The usual hand wheel 68 is secured to the tubular part 65 by means of a pin 69, although other types of securing means may be provided. The extension 64 also includes a lower collar 70 which is seated in a recess 71 formed in the top wall 67. The extension 64 is thus mounted for rotational movement only in the extension 61.

The collar 70 has a reduced diameter bore 72 therethrough. The valve stem 62 has a small diameter upwardly exposed extension 73 extending through the bore 72 and terminating in a collar 74 so as to prevent downward movement of the main portion of the valve stem 62 as compared to the extension 64.

An idler shaft 75 depends from the top wall 67 and is secured in a bore 76 therein for rotation by means of a locking ring 77. A cluster gear, generally referred to by the numeral 78, is rotatably journaled on the idler shaft 75. The cluster gear 78 includes gears 79 and 80 which are secured together for movement together.

A gear 81 is secured to a downward extension 82 of the extension 64 for movement therewith. The gear 81 is meshed with the gear 79. Another gear 83 is secured to the upper portion 73 of the main portion of the valve stem 62. The gear 83 is held on the upper portion 73 by means of a snap ring 84 and the cluster gear 78 is held on the idler shaft by snap rings 85. By making the gears 81 and 80 relatively large and the gears 79 and 83 relatively small, a desired multiplication of turning movement may be obtained.

At this time, it is pointed out that if desired, the extension 64 of the valve stem 62, as well as the various gears, may be formed of a suitable plastic material although metal could be used, if desired.

From the foregoing, it will be obvious that there has been devised a highly desirable valve suitable for the intended purpose. Although two preferred embodiments of the invention have been illustrated, it is to be understood that further minor changes may be made in the valve construction within the spirit and scope of the invention, as defined in the appended claims.

We claim:

A valve comprising a valve body having an inlet and an outlet, a flow passage extending between said inlet and said outlet, and a valve assembly carried by said valve body for selectively closing said flow passage, said valve assembly including an extension on said valve body, means releasably securing said extension to said valve body, a valve stem rotatably journaled in said extension and extending therethrough, a follower carried by said valve stem for movement into and out of said flow passage, a diaphragm telescoped over said follower and having a continuous peripheral edge clamped between said valve body and said extension, a guide mounted in said extension for movement towards and away from said flow passage, said guide and said follower being disposed in telescoped relation with said follower being guided by said guide, and means sealing said guide and said valve stem relative to said extension wherein fluid within said extension, upon opening movement of the valve, creates pressure that is exerted on said guide in opposition to flow passage fluid pressure on said diaphragm and said follower.

References Cited in the file of this patent

UNITED STATES PATENTS

| | | |
|---|---|---|
| 2,204,452 | Seppelfricke | June 11, 1940 |
| 2,388,989 | Mueser | Nov. 13, 1945 |
| 2,765,143 | Best | Oct. 2, 1956 |
| 2,953,346 | Liecke | Sept. 20, 1960 |

FOREIGN PATENTS

| | | |
|---|---|---|
| 943,857 | France | Mar. 21, 1949 |
| 1,142,760 | France | Sept. 23, 1957 |
| 1,211,043 | France | Oct. 5, 1959 |
| 1,249,282 | France | Nov. 21, 1960 |